Jan. 16, 1934.  A. E. LE COUR ET AL  1,943,679
HYDRAULIC BRAKE
Filed May 29, 1933   2 Sheets-Sheet 1
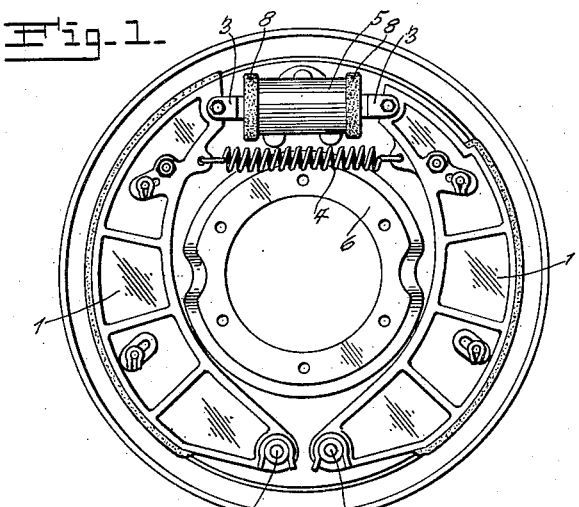
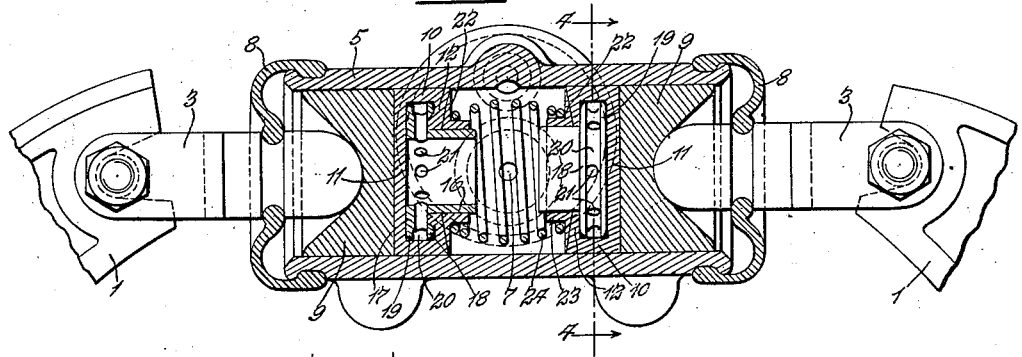
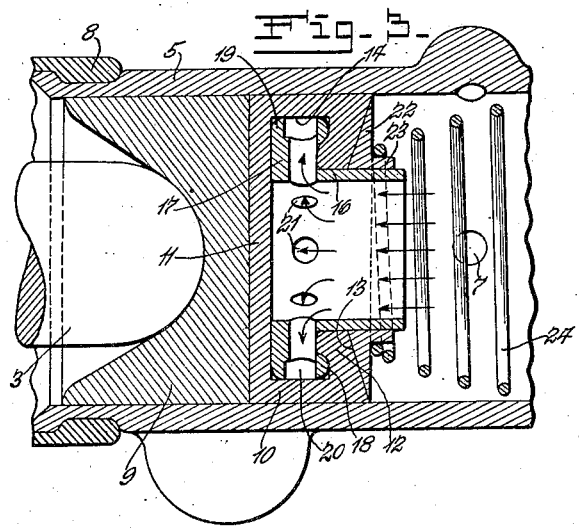
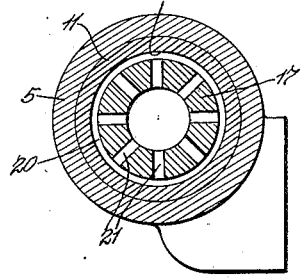
Inventors
Albert E. Le Cour
Emile Le Cour
by Hypsey & Kingsland
Their Attorneys

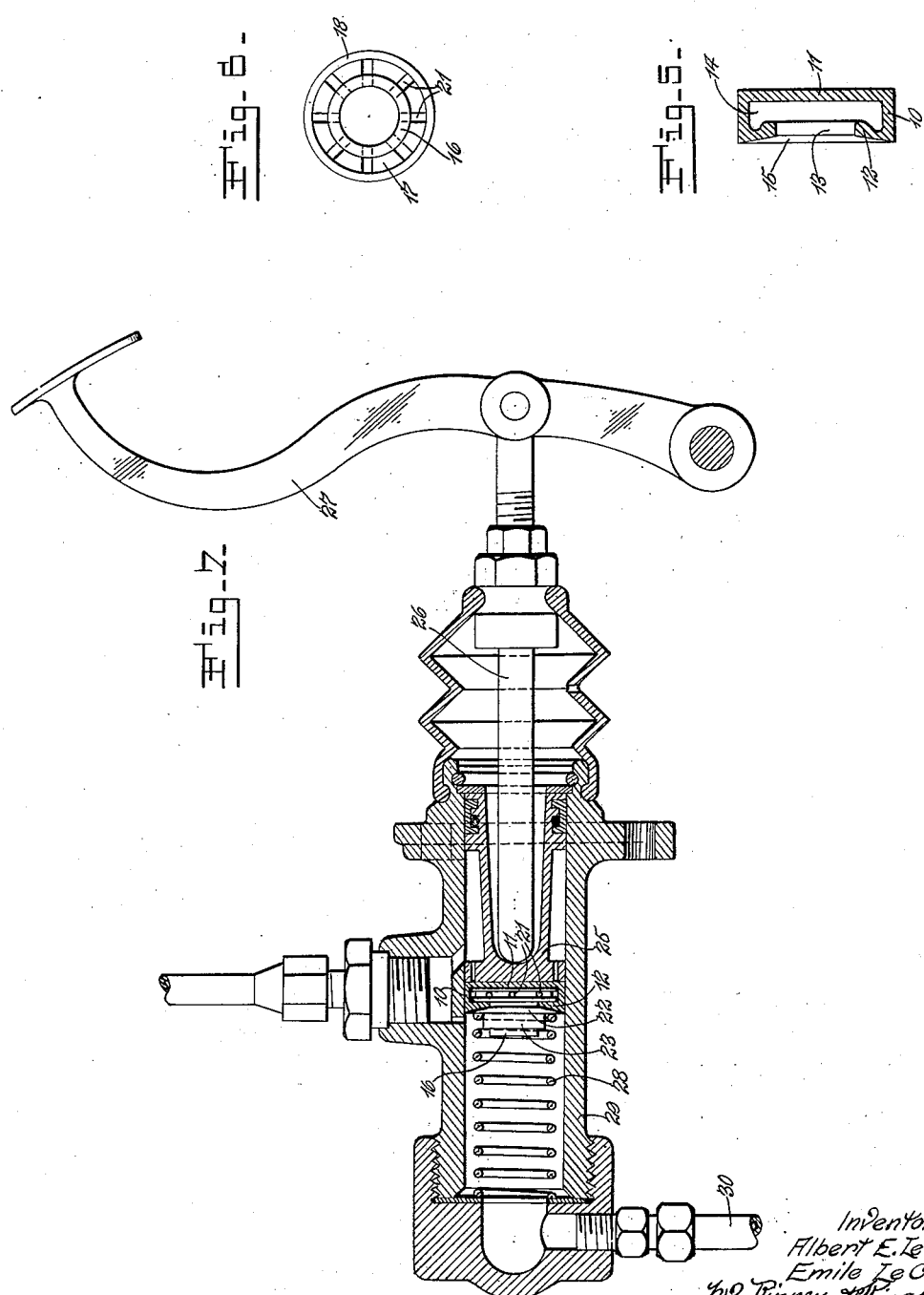

Patented Jan. 16, 1934

1,943,679

UNITED STATES PATENT OFFICE 1,943,679

HYDRAULIC BRAKE

Albert E. Le Cour and Emile Le Cour, St. Louis, Mo., assignors of one-third to Harold W. Haverson, one-third to Albert E. Le Cour, and one-third to Emile Le Cour, all of St. Louis, Mo.

Application May 29, 1933. Serial No. 673,407

5 Claims. (Cl. 309—34)

This invention relates to hydraulic brakes, and has special reference to improved sealing means associated with a piston in a hydraulic brake system in order to prevent the fluid from leaking across the periphery of the piston and between the piston and the wall of the cylinder in which the piston is mounted.

An object of the invention is to provide an improved sealing device comprising an elastic body having an imperforate wall seated against the adjacent end of a piston to be moved, in combination with an inelastic and inflexible fitting member mounted in said elastic body and having passages for admitting the brake operating fluid to the inside of the elastic body to expand the same against the wall of the cylinder adjacent to the end of the piston and thus prevent any leakage of the fluid across the periphery of said elastic body or into contact with the piston or from the cylinder in which the piston and the elastic body are mounted. In the attainment of this object of the invention, the fitting member mentioned is held out of contact with the piston by the imperforate wall of the elastic body covering the entire adjacent end of the piston and also the end of the fitting that is toward the piston.

Another object of the invention is to provide an improved sealing device comprising an elastic body having an opening into one end communicating with a radial groove on the inside of the body, in combination with a fitting member composed of solid substantially inelastic and inflexible material and having a tubular portion adapted to project through the opening in the elastic body and having a circumferential radial portion adapted to be received in said groove in said elastic body and provided with a peripheral groove and with openings from said peripheral groove to the inside of said tubular portion through which the brake operating fluid may pass into the space provided by said grooves and thereby expand the elastic body into sealing contact with the inside of the cylinder in which the device is mounted.

Various other objects and advantages of the invention may be apparent from the following description, reference being made to the annexed drawings, in which—

Fig. 1 is a side elevation of a brake having our invention in connection therewith.

Fig. 2 is a longitudinal sectional view of the invention and the cylinder in which it is mounted.

Fig. 3 is a sectional view showing essential features of the invention enlarged considerably over Fig. 2.

Fig. 4 is a cross sectional view on the line 4—4 of Fig. 2.

Fig. 5 is a cross sectional view of the elastic sealing device apart from the fitting member.

Fig. 6 is an end elevation of the fitting member that cooperates with the sealing device.

Fig. 7 is a sectional view of the mechanism that is associated with the brake pedal and having our improved sealing device in connection therewith.

The brake in connection with which the present invention is shown should be recognized as a standard commercially known type of brake having two arcuate brake shoes 1, each having one end mounted on a supporting pivot 2 and its opposite end engaged by an actuator 3. The actuators 3 are in axial alinement and are moved apart in order to operate the brake shoes 1 and are permitted to move toward each other when the brake shoes 1 are moved out of braking position by a connecting spring 4.

The cylinder 5 is attached to the rigid and stationary support 6 and has an inlet port 7 through which the fluid for operating the brakes passes. The adjacent ends of the actuators 3 extend into the open ends of the cylinder 5 through central openings in supporting flexible cap members 8 attached to the ends of the cylinder 5. Pistons 9 are mounted for sliding movements in the cylinder 5 and have recesses in their outer ends into which the ends of the actuators 3 extend into pivotal contact with the pistons 9, respectively. The inner ends of the pistons 9 are preferably flat and at right angles to the axes of said pistons, thus making the inner ends of the two pistons 9 parallel.

One of our improved sealing devices is in cooperative relation with each piston 9. As shown, each sealing device is a body of flexible elastic resilient pliable material, such as rubber, or a composition including rubber, or other appropriate substance, and includes an annular wall 10 having at one end an integral imperforate end wall 11 and at the opposite end an inwardly extended wall 12 having therethrough a central opening 13 and cooperating with the walls 10 and 11 to form a groove or space 14 within the body of the sealing device. The outer surface 15 of the wall 12 inclines symmetrically toward the axis of the body and to intersection with the wall of the opening 13, thus forming a concavity in the wall 12.

The diameter of this sealing device is approximately the same but may slightly exceed the inside diameter of the cylinder 5, and the outer surface of each wall 11 is flat or at right angles to the axis of the body and is designed and arranged to seat against the flat inner end wall of one of the pistons 9. All of the walls 10, 11 and 12 are imperforate with the exception of the central opening 13 through the wall 12.

Each fitting member is made of solid or rigid inflexible and inelastic material and comprises a tubular portion 16 having at one end a circumferential flange 17 with an annular bead or rib 18 on its inner end adjacent to its periphery and cooperating with a radial extension 19 of the flange 17 to provide a circumferential groove 20 around the flange 17. A number of holes 21 form passages from the inside of the tubular portion 16 to the groove 20.

One of these rigid fittings is cooperatively combined with each sealing device and is associated therewith in the manner shown, the flange 17 with the parts 18 and 19 extending into the groove 14 in the sealing device while the tubular portion 16 of the fitting member projects through and into contact with the wall of the opening 13 and for a distance beyond the surface 15. The flat end of this fitting member seats against the flat inner surface of the wall 11 and is thereby held out of contact with the adjacent piston 9, permitting the piston 9 and the sealing device to turn relatively in the cylinder 5.

A conical bearing wall 22 is mounted against the conical surface 15 of each wall 12 and has a hole through which the tubular portion 16 of the fitting member projects. An annular flange 23 surrounds the hole through the bearing wall 22 and the tubular portion 16 projects through said flange. The bearing wall 22 with its flange 23 slide freely along the tubular portion 16 and do not interfere with the compression and expansion of the sealing device.

In the arrangement shown in Fig. 2, one of these elastic sealing devices with its associated fitting member is mounted against the inner end of each piston 9 and a coil spring 24 has its opposite ends pressing against the bearing members 22, respectively. This spring 24 is effective to hold the bearing members 22 pressed against the sealing members and thereby hold all of the parts in assembled cooperative relationship. Of course, the spring 4 is stronger and of greater power than the spring 24 and will overcome the resistance of said spring 24 to release the brake shoes 1 from braking engagement with the brake drum.

One of these sealing devices with its associated fitting member is shown combined with the master piston 25, whereby the brake operating fluid is forced through the brake system and into the cylinders 5 to operate the pistons 9. The master piston 25 has operating connections 26 with a brake pedal lever 27, whereby said master piston 25 may be moved in opposition to the spring 28 to force fluid from the cylinder 29 through the tube 30 from which fluid is discharged through the opening 7 into each brake cylinder 5.

When the brake pedal 27 is operated to force fluid through the tube 30 into the cylinders 5, said fluid passes through the tubular portions 16 and through the holes 21 into the grooves 20 and thus radially and uniformly expands the sealing member into sealing contact with the inner surface of the wall of the cylinder 5. At the same time this fluid pressing against the bearing wall 22, which is of nearly the same diameter as the inside diameter of the cylinder drum, causes said bearing wall to spread the elastic sealing device and to cooperate with the pressure of the fluid on the inside of said sealing device. The conical bearing wall 20 functions on the order of a wedge in order to spread and expand the elastic sealing device. Thus, this wall 20 performs the functions of a support or bearing for the ends of the spring 24 and of a device cooperating with the fluid to expand the elastic sealing device into sealing contact with the inside of the cylinder 5.

From the foregoing, it is apparent that our improved sealing device is unattached to the piston and is expanded by two agencies, one of which is the fluid forced into the sealing device and the other of which is the bearing member 22 which presents a broad surface against which the fluid presses and is pressed in order to cause said bearing member to spread radially in every direction the adjacent wall 12 and thereby the wall 10 with which said wall 12 is connected. The spring 24 functions to hold the bearing members 22 against the concave walls 15 and to hold the assembly of elements forming each sealing unit against the adjacent piston 9 ready for immediate action when the brake pedal 27 is operated.

The construction and arrangement of this device and the relationship of the elements composing it may be varied within the scope of equivalent limits without departure from the nature and principle of the invention. We contemplate such variations as may be found desirable to adapt the invention for numerous uses to which it may be applied.

We claim:

1. The combination with a piston, of a sealing device composed of elastic material and including an imperforate end wall against and unattached to the end of the piston, a cylindrical wall integrally united with said end wall and extending in a direction away from the piston, and an end wall integrally united with said cylindrical wall and having a central hole and cooperating with said end wall and said cylindrical wall to form a groove within said sealing device; and a tubular fitting member composed of solid and inelastic material extending through said hole in said second end wall and having a radial flange extending into said groove and having openings from the inside of said tubular member through said flange to the inside of said groove.

2. The combination with a piston, of a sealing device composed of a body of elastic material having an internal groove and an opening from said groove through one end of said body; and a tubular fitting member composed of solid and inelastic material extending through said opening and having a radial flange extending into said groove and having openings from the inside of said fitting member through said flange to the inside of said groove.

3. The combination with a piston, of a sealing device composed of a body of elastic material having one end seated against said piston and having a concaved recess in its opposite end and having an internal groove and an opening from said groove through said end of said recess; a tubular fitting member composed of solid and inelastic material extending through said hole and having a radial flange extending into said groove and provided with a circumferential groove, with openings from said circumferential groove into said tubular member; and a conical bearing member mounted in said concavity and encircling said tubular member.

4. The combination with a piston, of a sealing device composed of a hollow body of elastic material having one end bearing against said piston and having its opposite end concaved; a tubular fitting member composed of solid and inelastic material extending into said body and having a circumferential flange provided with a circumferential groove and having openings from the inside of said tubular member through said flange to said groove; and a conical spreader for said body of elastic material mounted against said concaved end.

5. The combination with a piston, of a sealing device composed of a hollow body of elastic material having one end bearing against said piston and having its opposite end concaved; a tubular fitting member composed of solid and inelastic material extending into said body and having a circumferential flange provided with a circumferential groove and having openings from the inside of said tubular member through said flange to said groove; a conical spreader for said body of elastic material mounted against said concaved end; and a spring pressing said spreader against said elastic body.

ALBERT E. LE COUR.
EMILE LE COUR.